(12) United States Patent
Sakai et al.

(10) Patent No.: US 7,615,906 B2
(45) Date of Patent: Nov. 10, 2009

(54) JOINT STRUCTURE OF ELECTRIC WIRE, STATOR OF ROTARY ELECTRIC MACHINE, METHOD FOR MANUFACTURING THE SAME

(75) Inventors: Takeshi Sakai, Hitachinaka (JP); Yoshimi Mori, Mito (JP); Yasuhiko Kimura, Hitachinaka (JP); Masahiko Honma, Hitachiota (JP); Fuminori Ishikawa, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 318 days.

(21) Appl. No.: 11/438,591

(22) Filed: May 23, 2006

(65) Prior Publication Data

US 2006/0267440 A1 Nov. 30, 2006

(30) Foreign Application Priority Data

May 24, 2005 (JP) ............................. 2005-150316

(51) Int. Cl.
*H02K 3/50* (2006.01)
*H02K 3/04* (2006.01)
*H02K 15/00* (2006.01)

(52) U.S. Cl. ........................... 310/184; 29/596; 29/872; 310/180

(58) Field of Classification Search ................. 310/184; 29/868, 869, 872

See application file for complete search history.

(56) References Cited

U.S. PATENT DOCUMENTS

| | | | | |
|---|---|---|---|---|
| 6,459,177 | B1 * | 10/2002 | Nakamura et al. ............. | 310/42 |
| 6,501,206 | B2 * | 12/2002 | Oohashi et al. ............. | 310/184 |
| 6,894,415 | B2 * | 5/2005 | Koike ......................... | 310/184 |
| 6,946,759 | B2 * | 9/2005 | Asao et al. ..................... | 310/45 |

FOREIGN PATENT DOCUMENTS

EP 1 043 828 A2 10/2000

(Continued)

OTHER PUBLICATIONS

Partial European Search Report dated Jul. 24, 2007 (Five (5) pages).

(Continued)

*Primary Examiner*—Burton Mullins
(74) *Attorney, Agent, or Firm*—Crowell & Moring LLP

(57) ABSTRACT

When electric wires (joint conductors) are disposed adjacent each other in a peeled state of coatings, a gap corresponding to the total thickness of both conductors' insulating films as skin layers is formed between end joined face portions of the conductors. The gap becomes larger because the conductors are tapered. Therefore, the adhesion between both conductors is impaired, with a consequent fear of occurrence of joining imperfection. In opposed joined face portions of electric wires (joint conductors), the conductors are deformed from the tips of their axes to the joined face side in such a manner that exposed portions at the tips of the conductors and insulating film faces located in the vicinity thereof are flush with each other or the exposed portions are projected. The gap formed between the electric wires (joint conductors) can be diminished, whereby the reliability of connection is improved and it becomes easier to perform the work of joint conductors, with the result that the productivity of a stator of a rotary electric machine such as an AC generator for a vehicle could be improved.

9 Claims, 19 Drawing Sheets

FOREIGN PATENT DOCUMENTS

| | | |
|---|---|---|
| EP | 1 187 299 A2 | 3/2002 |
| EP | 1 341 292 A2 | 9/2003 |
| EP | 1 347 559 A2 | 9/2003 |
| JP | 2000-164043 A | 6/2000 |
| JP | 2000164043 A * | 6/2000 |
| JP | 2002-95198 A | 3/2002 |

OTHER PUBLICATIONS

Extended European Search Report dated Oct. 11, 2007 (Thirteen (13) pages).

* cited by examiner

JOINT STRUCTURE OF ELECTRIC WIRE, STATOR OF ROTARY ELECTRIC MACHINE, METHOD FOR MANUFACTURING THE SAME

CLAIM OF PRIORITY

The present application claim priority from Japanese application serial No. 2005-150316, filed on May 24, 2005, the content of which is hereby incorporated by reference into this application.

FIELD OF THE INVENTION

The present invention relates to a stator of a rotary electric machine such as, for example, an AC generator for a vehicle and a method for manufacturing the same, as well as a joint structure of electric wires and a method for manufacturing the same.

BACKGROUND OF THE INVENTION

According to a known electric wire, an end portion of an electric wire (a joint conductor) which end portion extends over a predetermined range from a tip of the wire is plastically deformed so that a sectional area thereof becomes smaller than that of a main portion of the conductor, and the wire is constructed so that the main portion and a part of the end portion near the main portion are coated uniformly with an insulating film, then two such electric wires (joint conductors) are joined together in a matched state of respective end portions.

[Patent Literature 1]
Japanese Patent Laid-Open Publication No. 2002-95198

In the above conventional technique, since the sectional area of the end portion is decreased while preventing damage of the insulating film, a heat input quantity can be decreased. Consequently, there is no fear that an insulating material located near a joined portion may be deteriorated with heat produced a joining work, and hence the insulating performance is not impaired.

In the above conventional technique, however, if two electric wires (joint conductors) are positioned adjacent each other in a peeled state of respective insulating coatings, there is formed a gap with corresponding to the total thickness of both conductor's insulating coatings as skin layers in a joined face portion between end portions of the conductors. The gap becomes larger because the conductors are tapered at their tips. Therefore, the adhesion between both conductors is impaired, with a consequent fear of occurrence of joining imperfection.

It is an object of the present invention to minimize the gap developed between electric wires (joint conductors), thereby improving the reliability of joining, and facilitate the conductor joining work, thereby improving the productivity of a state of a rotary electric machine such as, for example, an AC generator for a vehicle.

SUMMARY OF THE INVENTION

The present invention provides an electric wire joint structure comprising:
insulator-coated wires each having a portion where an insulator coating is removed to expose the conductor, wherein exposed portions of the conductors are opposed to each other to form joining faces; the joining faces of the exposed portions being flush with the surfaces of the insulator coatings of the insulator-coated wires or being projected from the surfaces of the insulator coatings of the insulator-coated wires, and the joining faces being metallurgically joined.

According to one aspect of the present invention, for achieving the above-mentioned object, in opposed joined face portions of electric wires (joint conductors), the axes of the conductors' exposed portions are offset relative to the axes of the insulating coating in such a manner that exposed tip portions of the conductors and insulating coating faces located in the vicinity thereof are flush with each other or the conductors' exposed portions are projected.

According to another aspect of the present invention constructed as above, since joined faces of the joined face portions at the tips of the conductors with insulating coatings removed confront each other, it is not necessary to keep the two pushed against each other with a strong force during the joining work. Besides, it is possible to diminish the likelihood of peeling-off of the joined face portion caused by springback after joining. As a result, not only the rationalization of the joining work can be attained, but also the reliability of the joined state of the joined face portion is improved and so are the productivity and reliability of, for example, the stator of a rotary electric machine.

DETAILED DESCRIPTION OF THE PREFERRED EMBODIMENTS

Embodiments of the present invention will be described hereinunder with reference to the drawings.

Figure 1:
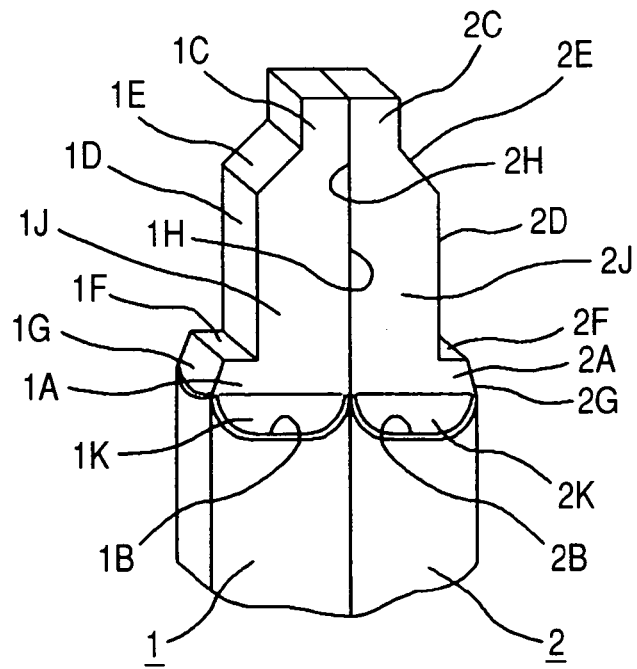
FIG. 1 is an enlarged perspective view showing a connection between electric wires (joint conductors) to which the present invention is applied.

FIG. 1 is an enlarged perspective view showing a connection between electric wires (joint conductors) to which the present invention is applied.

Electric wires (joint conductors) 1 and 2 respectively comprise conductors 1A and 2A of a rectangular section coated and insulated with enamel coatings 1B and 2B.

The enamel coatings 1B and 2B are chipped off at tips of the electric wires (joint conductors) 1 and 2 to form, at the tips, projecting portions 1C and 2C which are the smallest in sectional area. The small projecting portions 1C and 2C function as cutting portions when cutting a single long conductor (a detailed description will be given later) to form a conductor piece of a required length. Sectional area portions of a medium size, which function as welding portions 1D and 2D, are formed between the small projecting portions 1C, 2C and the enamel coatings 1B, 2B. One sides between the small projecting portions 1C, 2C and the welding portions 1D, 2D are connected together through first slant faces 1E and 2E having outward inclinations toward the enamel coatings 1B and 2B.

The welding face portions 1D, 2D and the enamel coatings 1B, 2B (portions of the largest sectional area) are connected together through stepped portions 1F and 2F.

Further, second slant faces 1G and 2G having outward inclinations toward the enamel coatings 1B and 2B are formed between the stepped portions 1F, 2F and the enamel coatings 1B, 2B.

The sides of the electric wires (joint conductors) 1 and 2 opposite to the side including the first slant faces 1E, 2E, and the stepped portions 1F, 2F are formed flat from the enamel coatings 1B and 2B up to tips of the small projecting portions 1C and 2C.

At the flat face portions, indicated at 1H and 2H, the tip portions of the joint conductors 1 and 2 are in close contact with each other.

This construction is characteristic in that there is no gap between joined faces formed by the flat face portions-1H and 2H. As a result, the heat dissipating area of the joined face portions diminishes by about 25% and it becomes possible to effect joining to a satisfactory extent with a relatively small quantity of heat during welding. Coupled with a reduced quantity of heat because of a small sectional area of the tip portions of the conductors, it becomes possible to conduct heating more effectively.

The remaining two faces at the tips of the electric wires (joint conductors) 1 and 2 are formed as flat faces 1J, 2J and flat faces (not shown) on the back sides.

Also on the flat faces 1J and 2J the enamel coatings 1B and 2B are chipped off to form third slant faces 1k and 2K which are inclined outwards toward the enamel coatings 1B and 2B. This is also true of the back faces.

The first slant faces 1E, 2E, the second slant faces 1G, 2G, the third slant faces 1K, 2K, the flat faces 1J, 2J and their back faces are formed with edges of a cutter (to be described later) which chips off the coatings 1B and 2B of the conductors.

Figure 2:
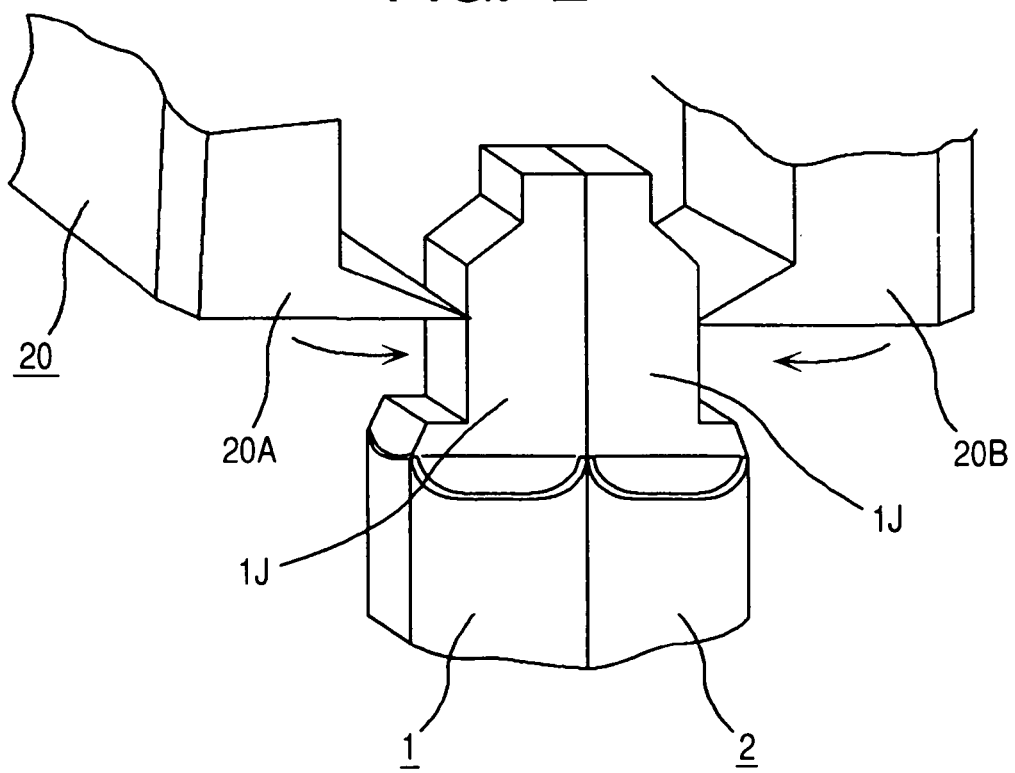
FIG. 2 is a diagram illustrating a process of cutting joined face portions into a shape easy to weld.

FIG. 2 is a diagram explanatory of a process of cutting the joined face portions into a shape which facilitates welding.

Before welding, the tip portions of the electric wires (joint conductors) 1 and 2 are cut by operating cutting edges 20A and 20B of a cutter 20 in the directions of arrows in FIG. 2 at intermediate positions (shown in FIG. 2) of the welding face portions 1D and 2D as portions of a medium sectional area.

Figure 3:
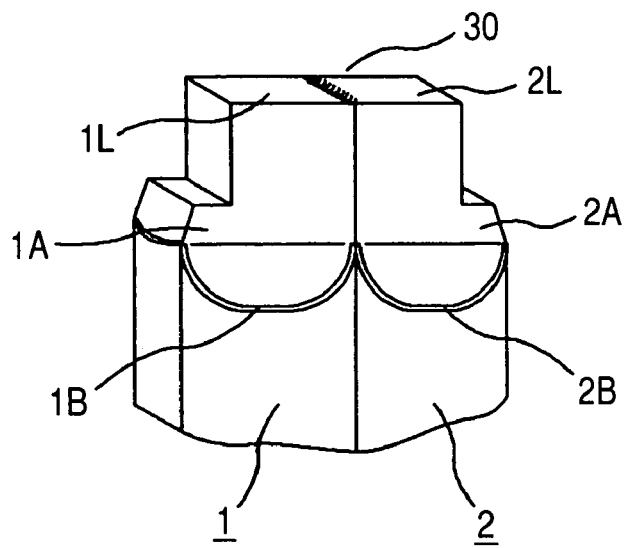
FIG. 3 is a diagram showing a welded state of the joined face portions.

FIG. 3 shows a welded state of both conductors by Tig welding (Tungsten Inert Gas welding) on the cut faces.

Figure 4:
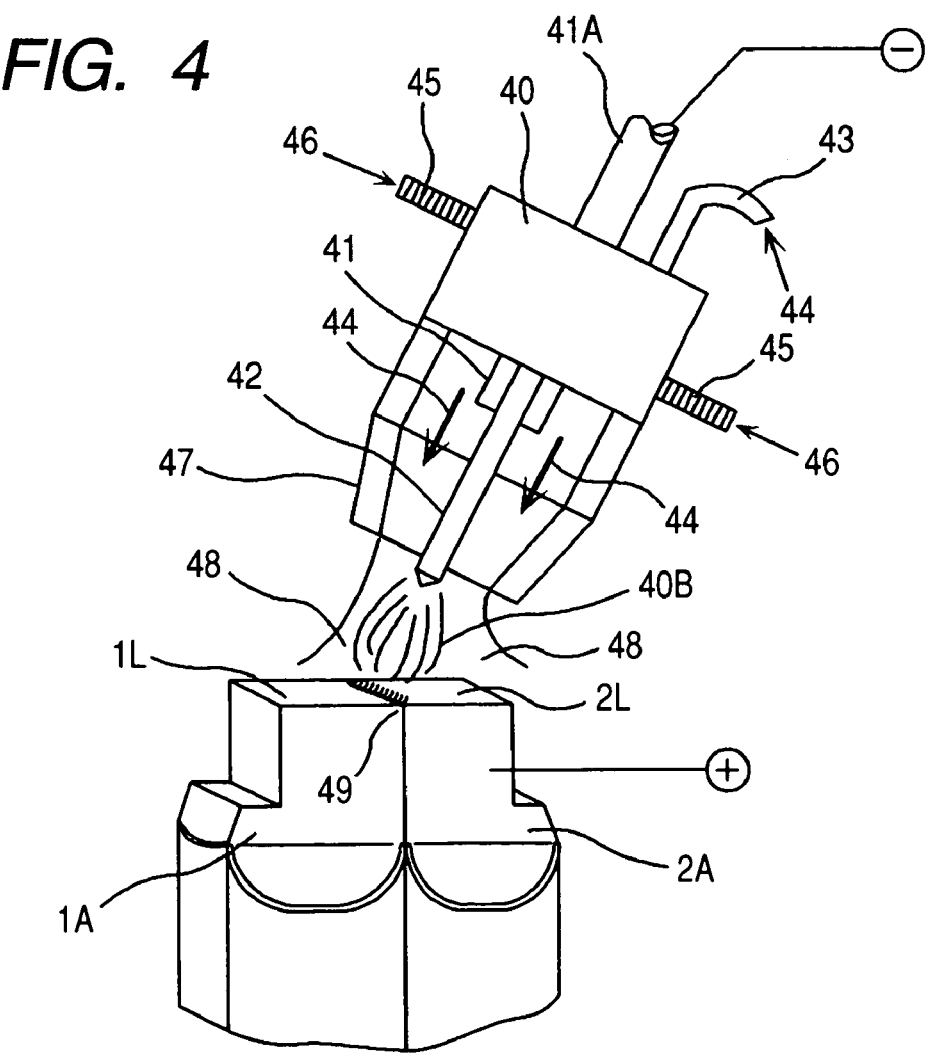
FIG. 4 is a diagram for explaining in what state the joined face portions are Tig-welded.

FIG. 4 illustrates in what manner the joined face portions are Tig-welded.

By welding the cut faces, indicated at 1L and 2L, by Tig welding (Tungsten Inert Gas welding), the joined faces of the electric wires (joint conductors) 1A and 2A are joined together by molten metal 30.

More specifically, a heat-resistant tungsten electrode 42 is held in a collet 41 of a torch 40 and an inert gas (argon or helium gas) 44 is introduced through a gas introducing pipe 43 around the tungsten electrode 42 and is ejected through a gas nozzle 47 to around a welding portion. A jet 48 of the inert gas cuts off the welding portion from air, creating an oxygen-free state. As a result, the material is difficult to be oxidized because there is no oxygen (air) in the welding portion. Since the electric wires (joint conductors) 1A and 2A are copper wires, they are used as positive electrodes, while an electrode 41A of the collet 41 is used as a negative electrode, and a DC voltage is applied, causing an arc 40B to be produced between the tungsten electrode 42 and the joined faces 1L, 2L of the electric wires (joint conductors) 1A, 2A. In this welding, the temperature of the arc 40B reaches a temperature of 5000 to 30000 degrees. With the heat of the arc 40B, the joined face portion between the joined faces 1L and 2L is melted and welded.

The smaller the heat dissipating area and the smaller the amount of heat dissipated, the earlier the temperature of the welding portion can be raised up to the metal melting temperature.

Besides, since there is no gap between the joined faces, there is no sump of air (oxygen), and even if a negative pressure portion occurs in the welding portion by the flow of inert gas which is blown off against the welding portion, there is no fear of air (oxygen) being introduced (flowing reverse) into the joined face portion and the welding portion is so much difficult to be oxidized, because in the welding portion there is not such a gap as serves as an air introducing passage.

Since the joined faces are in close contact with each other, it is not necessary push the joined faces with a strong force from the exterior during welding. The problem that the joined portion springs back (a phenomenon that the joined portion repulses the pushing force and tends to revert to the original separated state) after welding, causing separation of the welded portion, is also solved. Further, it is not necessary to retain the pushing force until the joined portion gets cold for the prevention of separation caused by such a spring-back phenomenon, and the time required for the joining can so much be shortened.

When the electric wires (joint conductors) are joined in a stand-up state, the stepped portions 1F and 2F act as receiving portions of molten metal spatter, whereby the possibility of the spatter adhering to for example of the face of the insulating film and impairing the insulating property can also be diminished.

Now, with reference to FIGS. 5 and 6, a description will be given below about a method and apparatus for manufacturing the electric wires (joint conductors) 1 and 2 described above.

As also described earlier, the electric wires (joint conductors) 1 and 2 according to this embodiment are rectangular conductors whose section perpendicular to the longitudinal axis of each conductor is a rectangular section comprising long and short sides. The outer peripheries of the electric wires are coated for insulation with enamel coatings 1A and 2A.

In case of welding an end portion of a conductor to another conductor, the enamel coating thereof becomes an obstacle. Therefore, it is necessary to remove the enamel coating on the end portion of each conductor which portion serves as a conductor joined face portion to facilitate welding. Besides, the machining method should be a method suitable for automation so that the enamel coating removing work and a cutting work for cutting the conductor into a specific length suitable for the purpose of use.

Figure 5:
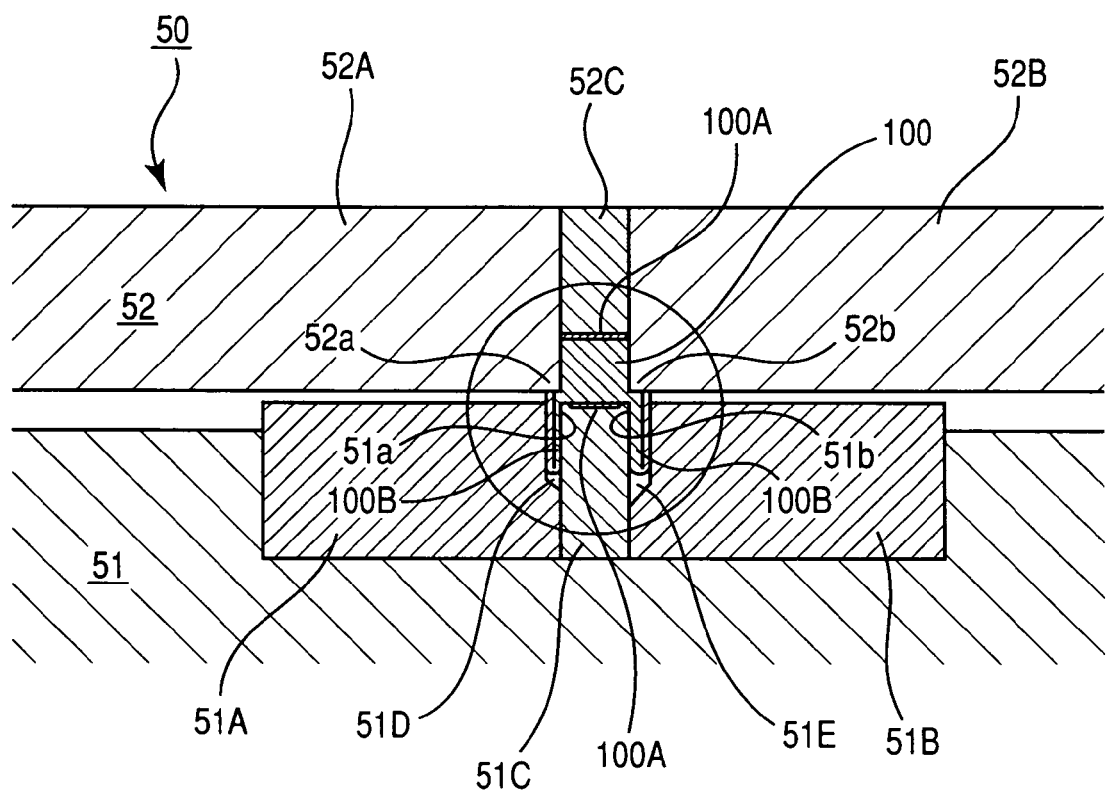
FIG. 5 is a diagram showing a process of chipping off enamel coatings on short sides.
Figure 6:
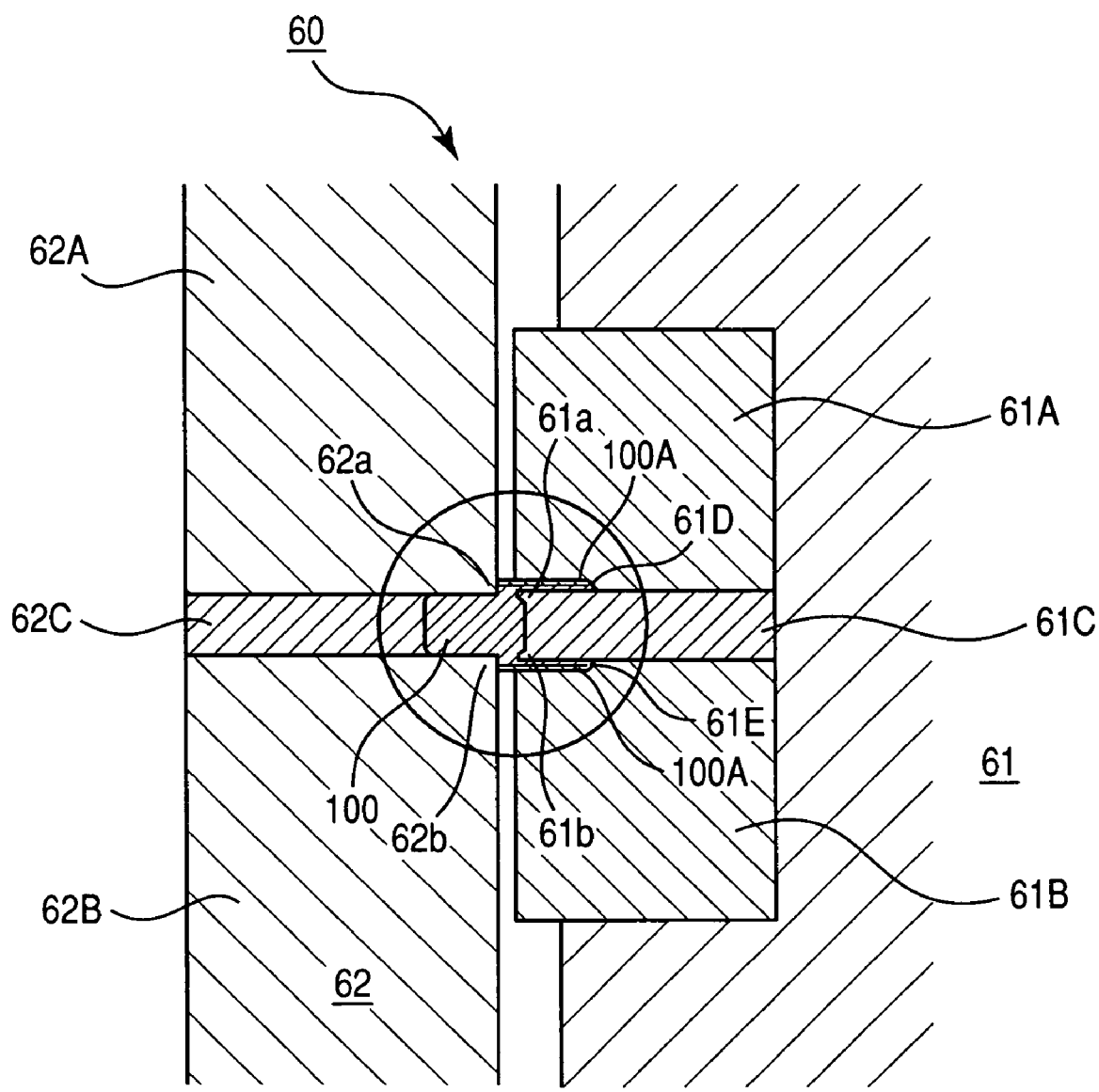
FIG. 6 is a diagram showing a process of chipping off enamel coatings on long sides.
Figure 7:
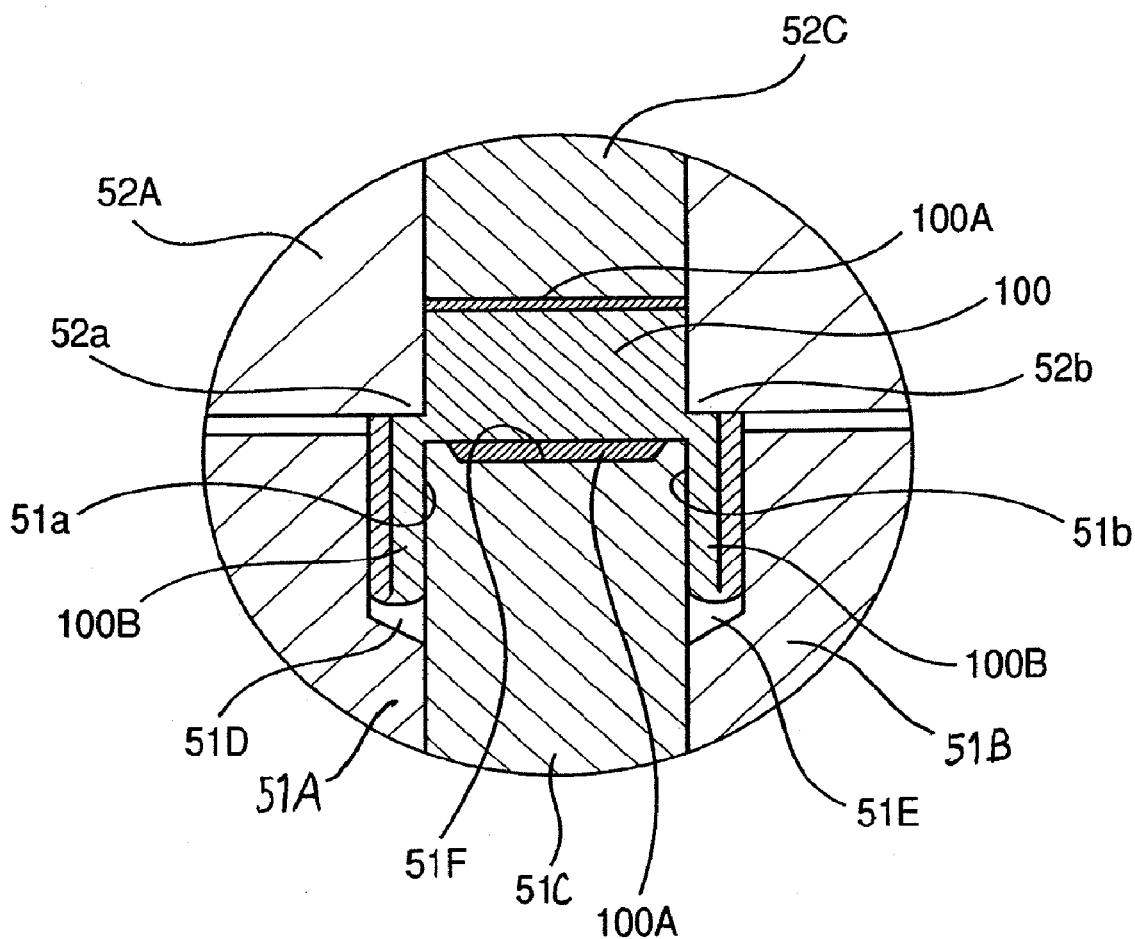
FIG. 7 is an enlarged diagram of a circular frame portion in FIG. 5.
Figure 8:
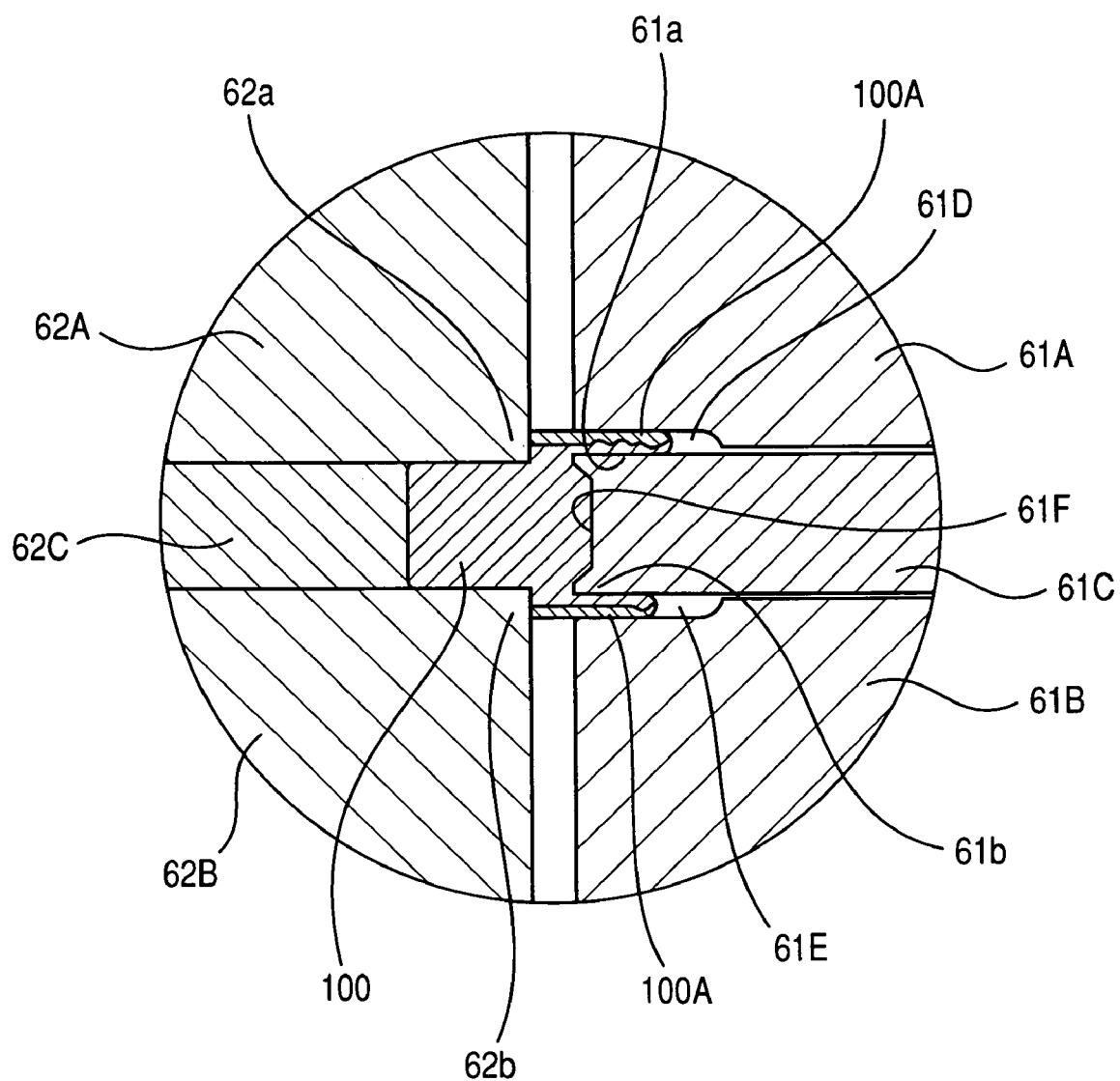
FIG. 8 is an enlarged diagram of a circular frame portion in FIG. 6.
Figure 9:
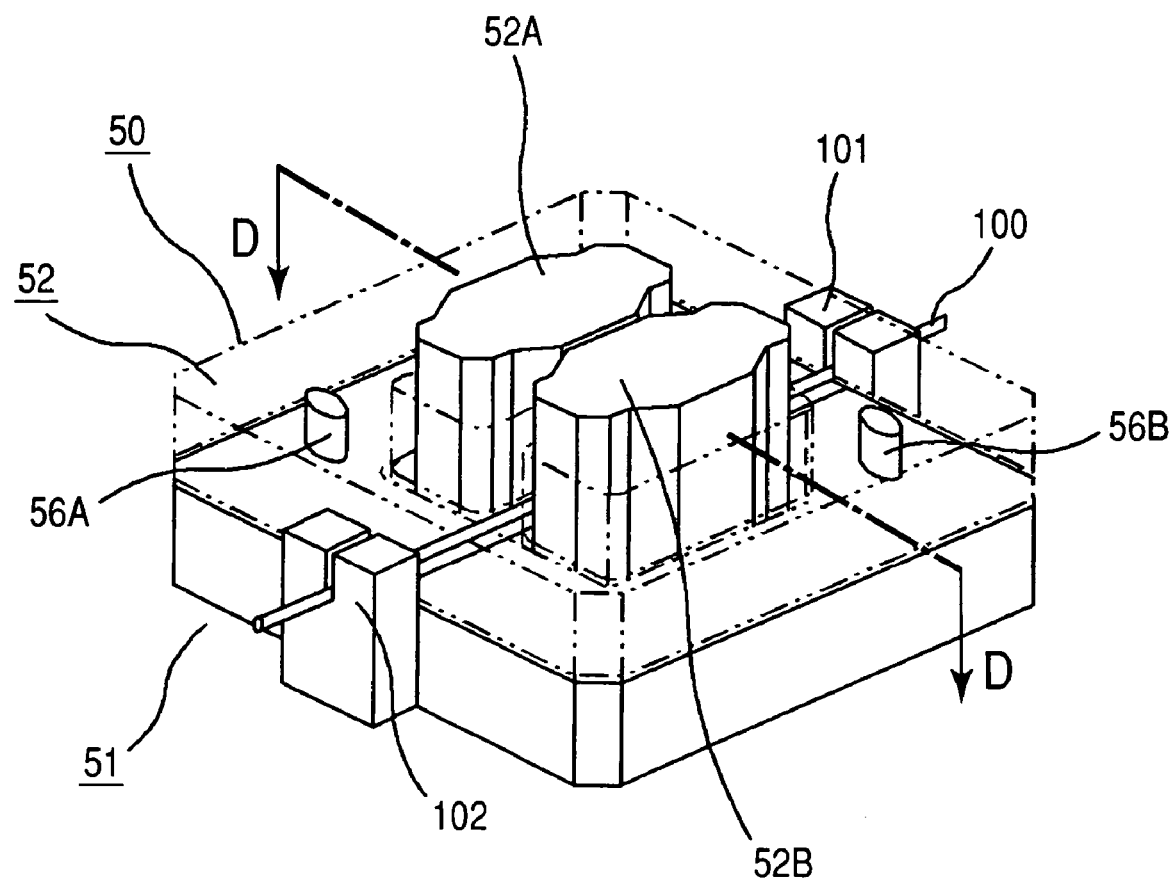
FIG. 9 is an appearance diagram of a chip-off device.

FIGS. 5 to 12 are drawings for explaining the enamel coating removing work, of which FIG. 5 illustrates a process of chipping off the enamel coatings on short sides, FIG. 6 illustrates a process of chipping off the enamel coatings on long sides, FIG. 7 is an enlarged diagram of a circular frame portion in FIG. 5, FIG. 8 is an enlarged diagram of a circular frame portion in FIG. 6, and FIG. 9 is an appearance diagram of a chip-off device.

Chip-off devices 50 and 60 comprise fixed dies 51, 61 and movable dies 52, 62.

The fixed dies 51 and 61 comprise a pair of fixed clamping fixtures 51A, 51B and a pair of fixed clamping fixtures 61A, 61B, respectively, and centrally provided, combined conductor guides and fixed blades 51C and 61C, respectively.

The movable dies 52 and 62 comprise a pair of movable cutting blades 52A, 52B and a pair of movable cutting blades 62A, 62B, respectively, and centrally provided, conductor pressers 52C and 62C, respectively.

The combined conductor guides and fixed cutting blades 51C, 61C and the movables cutting blades 52A, 52B, 62A, 62B have respective edges 51a, 51b, 61a, 61b, 52a, 52b, 62a, and 62b.

The chip-off devices 50 and 60 are installed side by side before and after a machining line. An enamel coating 100A on each short side is first excised and this excised portion is fed to the position of the chip-off device 60, where the enamel coating 100A on each long side is chipped off. In this way enamel coating 100A-chipped off portions are formed continuously at certain intervals on the long conductor.

As shown in FIG. 9, at an inlet and an outlet of the chip-off device 50 there are provided conductor feed guides 101 and 102, respectively, for feeding straight an insulated conductor. An insulated conductor 100 which has been fed over a certain length by means of a feeder (not shown) is guided into a groove 51F in such a manner that long sides of the conductor 100 come into abutment against the slot, the groove 51F (FIG. 7) being formed in an end face of the combined conductor guide and fixed cutting blade SiC in the chip-off device 50.

Figure 10:
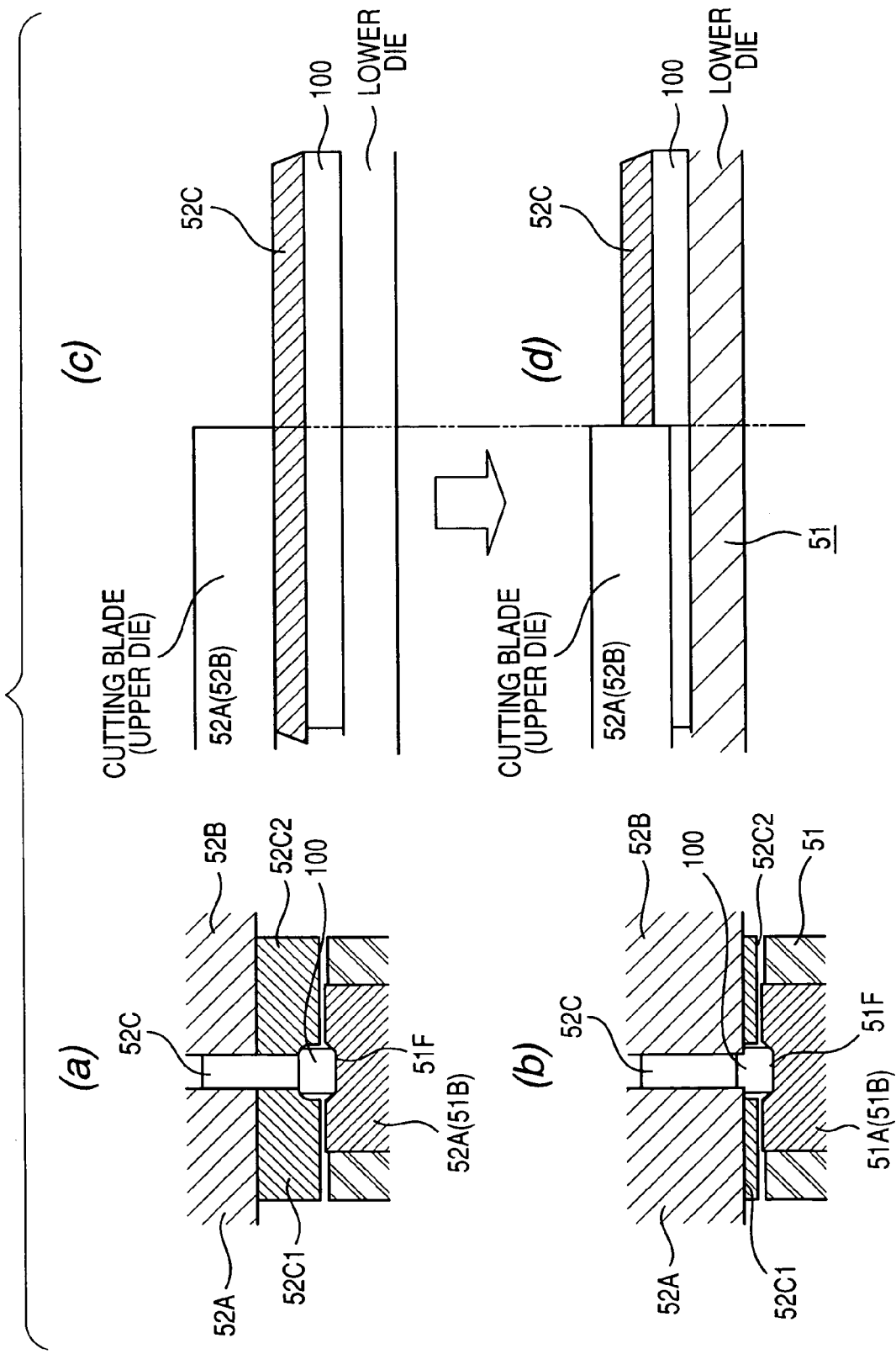
FIGS. 10A to 10D are diagrams for explaining a process of chipping off enamel coatings on shorts sides.

As shown in FIGS. 5, 7 and 10, the insulated conductor 100 is pressed down in the direction of the combined conductor guide and fixed cutting blade 51C by means of the conductor presser 52C which is disposed at a position confronting the combined conductor guide and fixed cutting blade 51C, whereby the position of the insulated conductor 100 is fixed (see FIGS. 10A and 10C).

Next, the movable blades 52A and 52B move from above to below in the drawings, with the result that a shear force is developed between the edges 52a, 52b of the movable cutting blades 52A, 52B and the edges 51a, 51b of the combined conductor guide and fixed cutting blade 51C. The drawings illustrate a state in which the coating is being chipped off with the shear force. The chipped-off coating and a part of the conductor (chips resulting from cutting) are held in gaps 51D and 51E formed between the fixed clamping fixtures 51A, 51B and the combined conductor guide and fixed cutting blade 51C (see FIGS. 10B and 10D).

When the chipping-off of the enamel coating 100A on short sides is over, the insulated conductor 100 is fed to the position of the next chip-off device 60 by means of a feeder (not shown).

Figure 11:
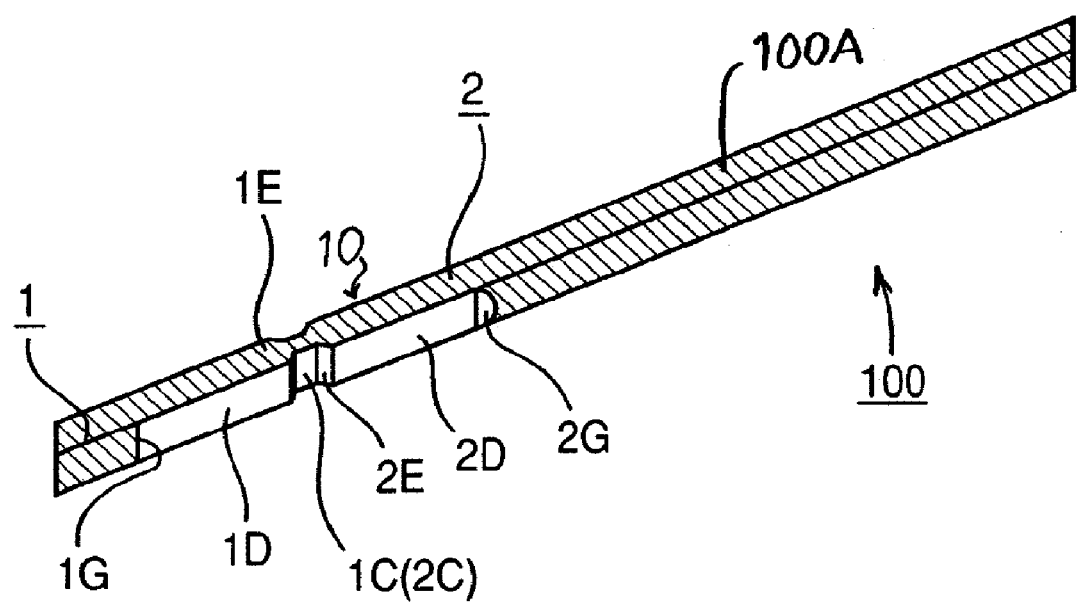
FIG. 11 is a perspective view showing insulated conductors after chipping-off of the short-side enamel coatings.
Figure 12:
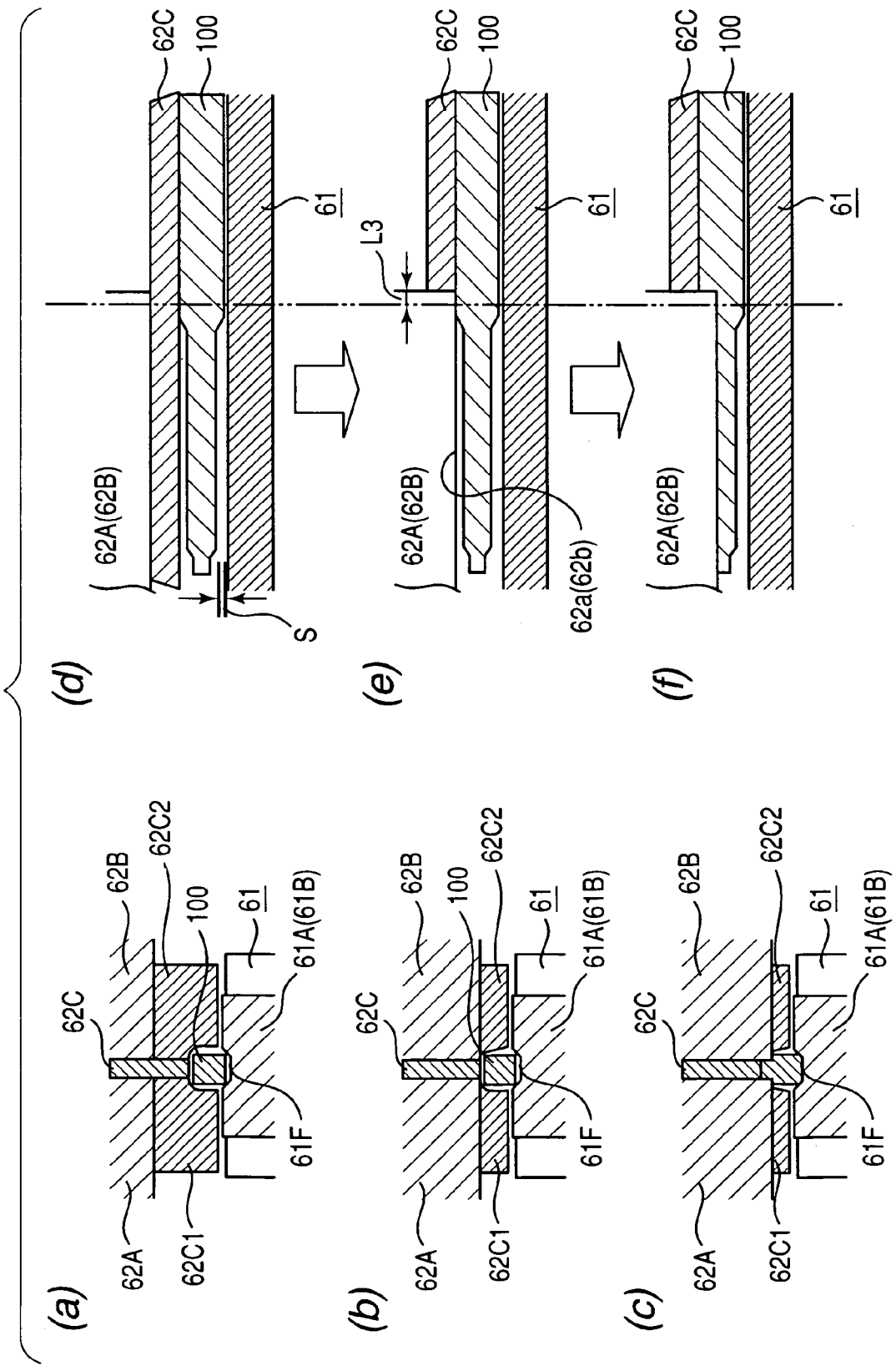
FIGS. 12A to 12F are diagrams for explaining a process of chipping off enamel coatings on long sides.

FIG. 11 shows an appearance of the insulated conductor upon completion of chipping-off of the short-side enamel coating 100A. The same constituent portions as in FIG. 1 are identified by the same reference numerals as in FIG. 11.

The chip-off device 60 is disposed at a position corresponding to a 90°-rotated position of the chip-off device 50. The movable cutting blades 62A and 62B of the chip-off device 60 are disposed on the same machining line so as to reciprocate perpendicularly to the movable cutting blades 52A and 52B of the chip-off device 50.

Like the device shown in FIG. 9, the chip-off device 60 is also provided with conductor feed guides 101 and 102 at an inlet and an outlet, respectively, for feeding the insulated conductor straight. The enamel coating 100A-chipped off portion on a short side of the insulated conductor 100 which has been fed a certain length by the feeder (not shown) is set to the position of a groove 61F which is formed in an end face of the combined conductor guide and fixed cutting blade 61C of the chip-off device 60. In this state a gap is still present between the face of the chipped-off portion and the face of the groove 61F (see FIGS. 12A and 12D).

FIGS. 6 and 8 show an interim state. Before reaching the state shown in FIGS. 6 and 8, first the movable blades 62A and 62B move from right to left in the figures, with the result that the edges 62a and 62b of the movable cutting blades 62A and 62B come into abutment against the to-be-chipped off portion of the insulated conductor 100. As shown in FIGS. 12B and 12E, the edges 62a and 62b of the movable cutting blades 62A and 62B are formed axially longer than the edges 52a and 52b of the movable cutting blades 52A and 52B, so that the insulated conductor can be chipped off over a longer axial portion than the portion which has been cut with the edges 52a and 52b of the movable cutting blades 52A and 52B in the previous process. Consequently, it is possible to solve the problem that the conductor is torn off in the portion of a small sectional area previously chipped off when the edges 62a and 62b of the movable cutting blades 62A and 62B come into abutment against only the said potion of a small sectional area.

Further, as the edges 62a and 62b of the movable cutting blades 62A and 62B move toward the combined conductor guide and fixed cutting blade 61C, the long-side portions with the sectional area not reduced yet begin to be chipped off by the edges 62a and 62b. At this time, the pressing force of the movable cutting blades 62A and 62B is borne by abutment of an outer face of the axially outer portion of a larger sectional area with respect to the portion chipped off previously by the edges 52a and 52b of the movable cutting blades 52A and 52B against the fixed clamping fixtures 61A and 61B (see FIGS. 12B and 12E).

Then, as the edges 62a and 62b move toward the combined conductor guide and fixed cutting blade 61C, the edges 62a and 62b reach the face of the portion of a smaller sectional area which was chipped off with the edges 52a and 52b of the movable cutting blades 52A and 52B in the previous process. At this time, the portion chipped off in the previous process and reduced in sectional area undergoes the pressing force of the conductor presser 62C and that of the movable cutting blades 62A, 62B and is deformed leftwards in the drawings. This deformation continues until the groove 61F-side face of the portion reduced in sectional area is pressed against the bottom face of the groove 61F (see FIGS. 12C and 12F).

After abutment of the groove 61F-side face of the portion reduced in sectional area against the bottom face of the groove 61F, the conductor is excised with a shear force developed between the edges 62a, 62b of the movable cutting blades 62A, 62B and the edges 61a, 61b of the combined conductor guide and fixed cutting blade 61C.

FIGS. 6 and 8 show an interim state, in which the chipped-off coating 100A and a part of the conductor (chips resulting from cutting) are held in gaps 61D and 61E formed between the fixed clamping fixtures 61A, 61B and the combined conductor guide and fixed cutting blade 61C.

In FIG. 9, the fixed and movable dies 51, 52 and cutting blades are positioned by positioning pins 56A and 56B.

Figure 13:
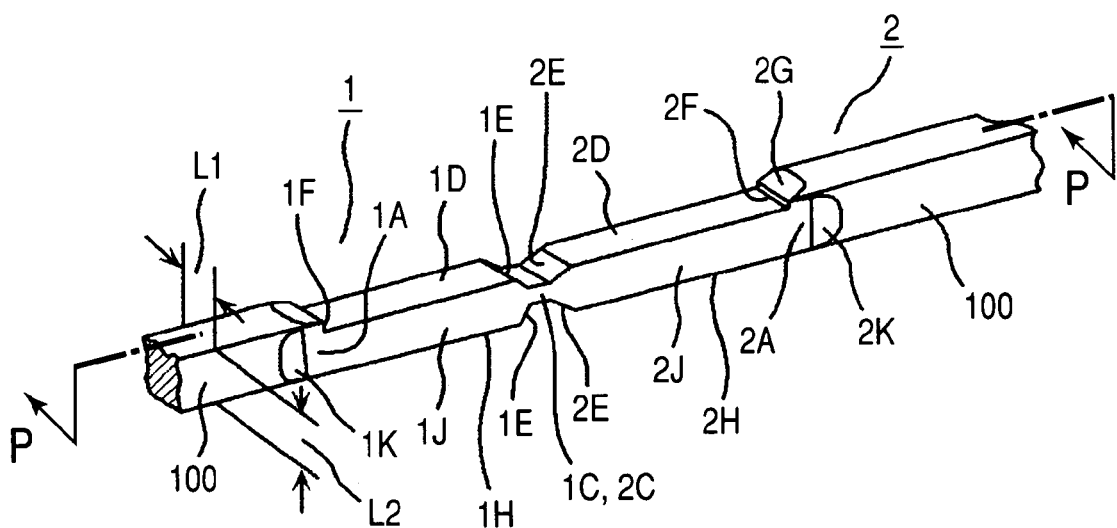
FIG. 13 is a perspective view showing the insulated conductors after chipping-off of the short- and long-side enamel coatings.

FIG. 13 shows the insulated conductor 100 after chipping-off of the short- and long-side enamel coatings. The reference numerals described in FIG. 13 are the same as those used for the electric wires (joint conductors) 1 and 2 in FIG. 1, indicating the same portions as in FIG. 1.

After the enamel coatings have been chipped off by the excising devices 50 and 60, the pair of electric wires (joint conductors) 1 and 2 assume a state in which both are connected together through the projecting portion 1C.

The portion of the smallest sectional area is formed by central edge portions of the edges 52a and 52b of the movable cutting blades 52A and 52B when the short-side coating is chipped off. In FIG. 13, the size of a short side is L1 and that of a long side is L2, both being in the relation of L1<L2.

A cutting device is disposed at a position just behind the chip-off device 60 on the machining line. When the chipping-off is completed by the chip-off device 60, the electric wires are fed up to the position of the cutting device.

Figure 14:
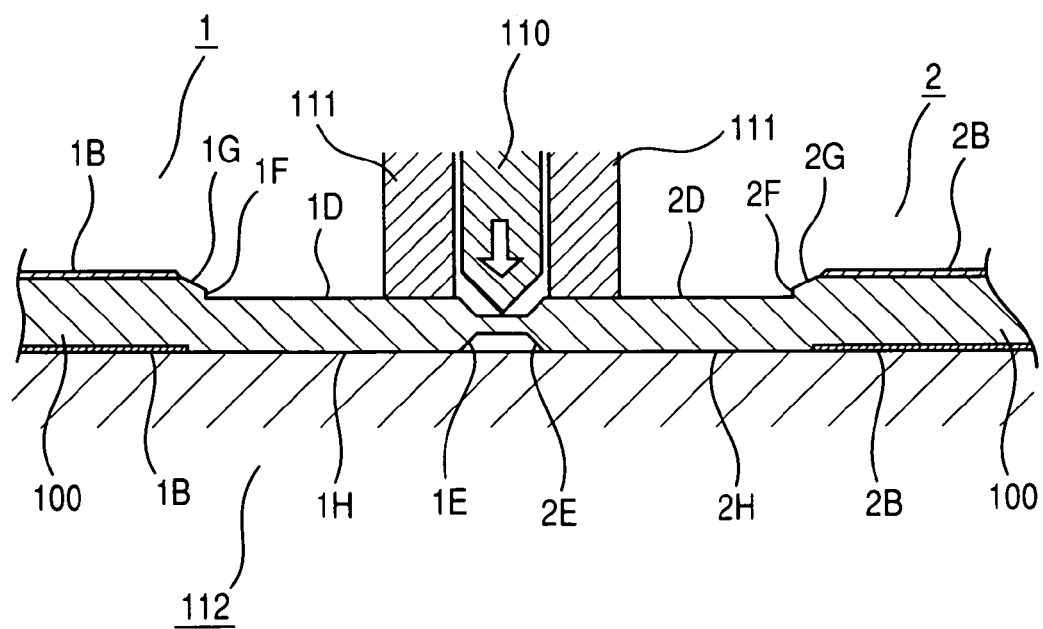
FIG. 14 is a diagram showing a state in which the insulated conductors after chipping-off of the short- and long-side enamel coatings have been set to a cutting device.

FIG. 14 is a sectional view taken along line P-P in FIG. 13, showing a state in which the insulated conductors are set to the cutting device.

As shown in FIG. 14, the cutting device includes a cutting blade 110 and cut assisting fixtures 111 disposed on both sides of the cutting blade 110. The cut assisting fixtures 111 function not only as guides for the cutting blade 110 but also as holding fixtures for holding the conductors firmly. In a state in which the conductors are pressed against a receiving die 112 by the cut assisting clamping fixtures 111, the cutting blade 110 is moved toward the receiving die 112, whereby the portion of the smallest section is cut to form a projecting portion 1C.

At this time, the faces of the electric wires (joint conductors) 1 and 2 which faces are in contact with the receiving die 112 form joined faces 1H and 2H after the cutting. As shown clearly in FIG. 14, the joined faces 1H and 2H are deformed (offset to one side from the center) so as to be flush (coplanar) with the faces of the enamel coatings 1B and 2B.

Figure 15:
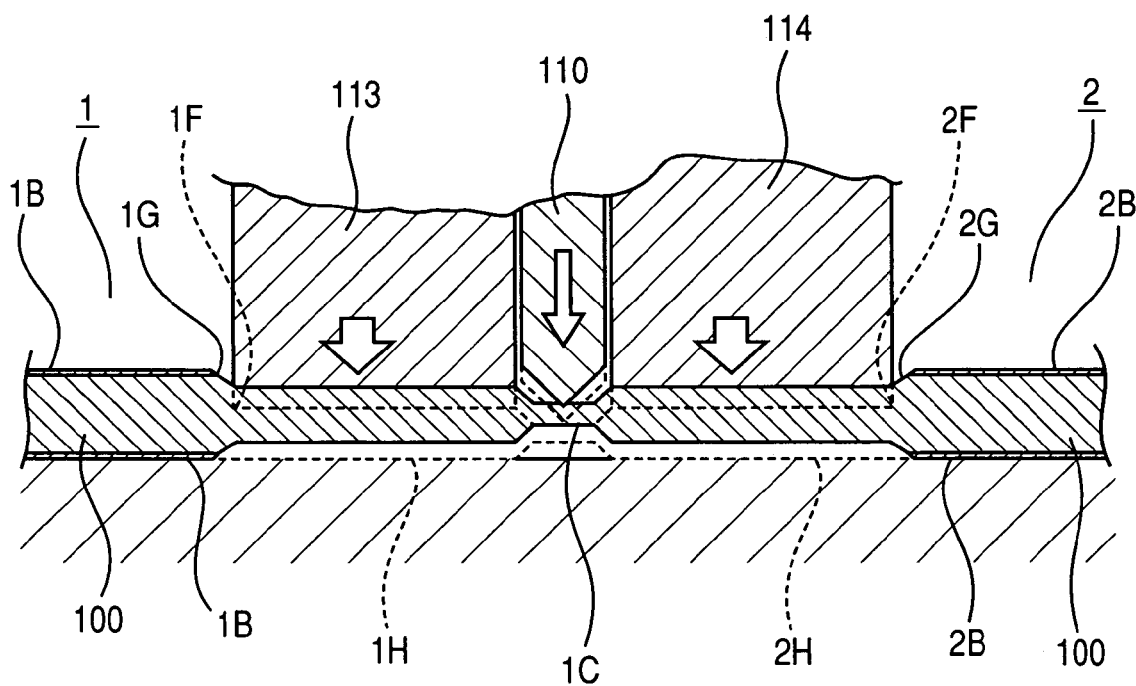
FIG. 15 is a diagram for explaining another machining method.

Although in the above embodiment the enamel coating-chipped off portions are thus deformed (offset to one side from the center) simultaneously with the chipping-off of the long-side enamel coating, there may be adopted a method wherein the portions in question are not deformed (offset to one side from the center), but are pressed and deformed longitudinally as indicated with broken lines by pressing fixtures 113 and 114 in the cutting process, as shown in FIG. 15, followed by cutting of the portion of the smallest section with use of the cutting blade 110.

Figure 16:
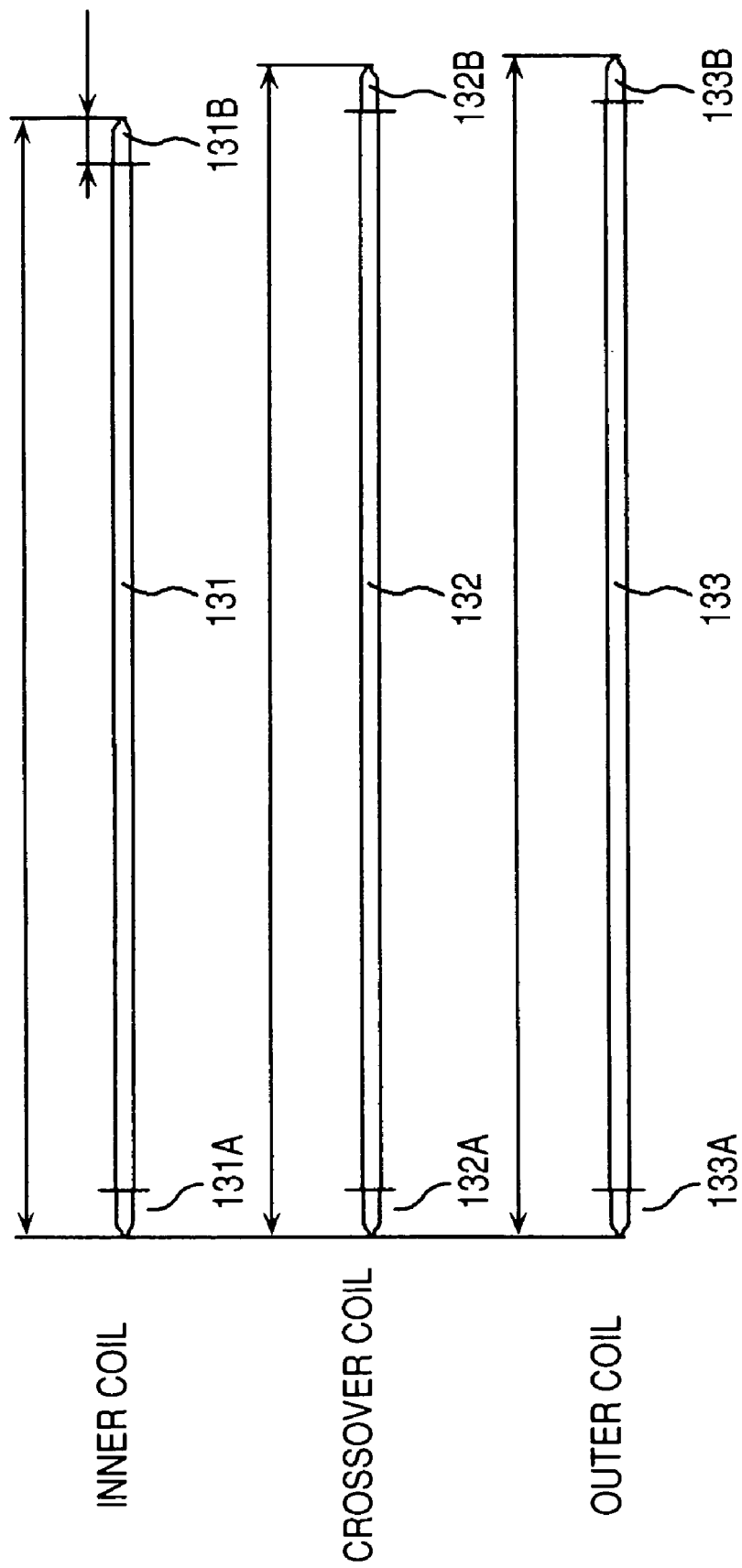
FIG. 16 is a diagram showing base metals of coil conductors used in a stator of a rotary electric machine.

FIG. 16 illustrates coil conductors in a stator of a rotary electric machine which is provided with the electric wires (joint conductors) shown in FIGS. 1, 13 and 14.

The coil conductors, which constitute a stator in the rotary electric machine, are an inner coil 131 inserted inside a slot of the stator, an outer coil 133 inserted outside the slot, and a crossover coil 132 which provides a connection between the inner and outer coils.

Enamel coating-chipped off portions 131A, 131B, 132A, 132B, 133A, and 133B of the shape described above are formed at both ends of the coil conductors by the above process.

Figure 17:
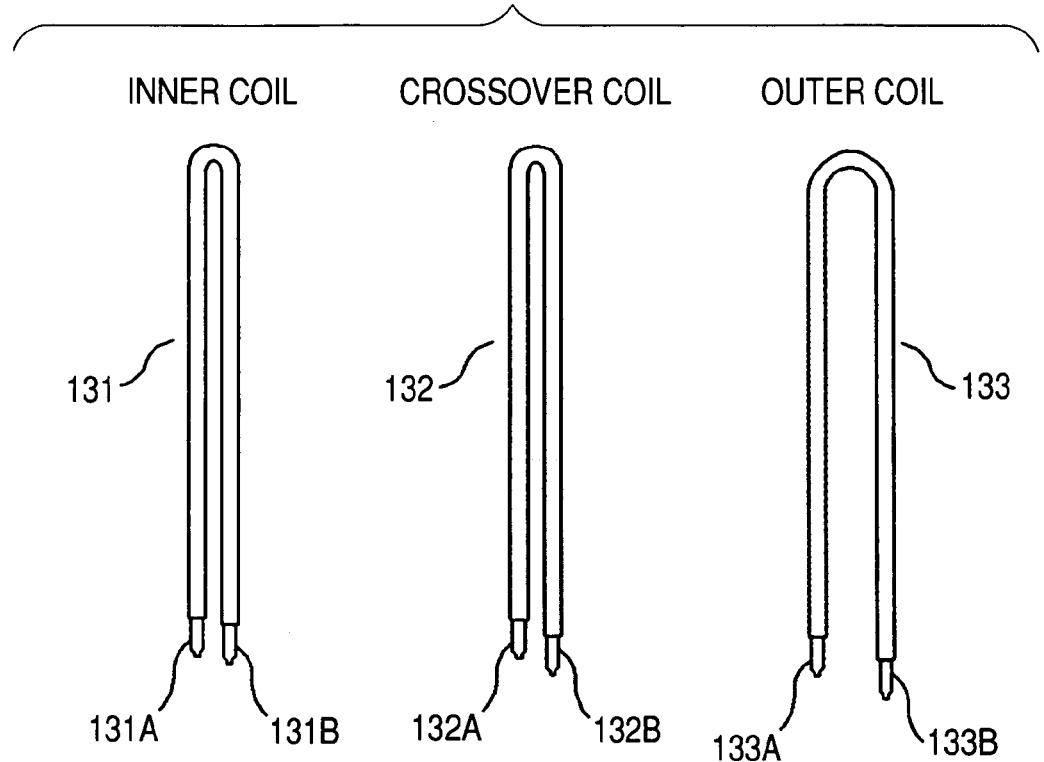
FIG. 17 is a diagram showing bent coil conductors.

Each coil conductor is bent nearly centrally, as shown in FIG. 17. A description on the bending process will be described later.

Figure 18:
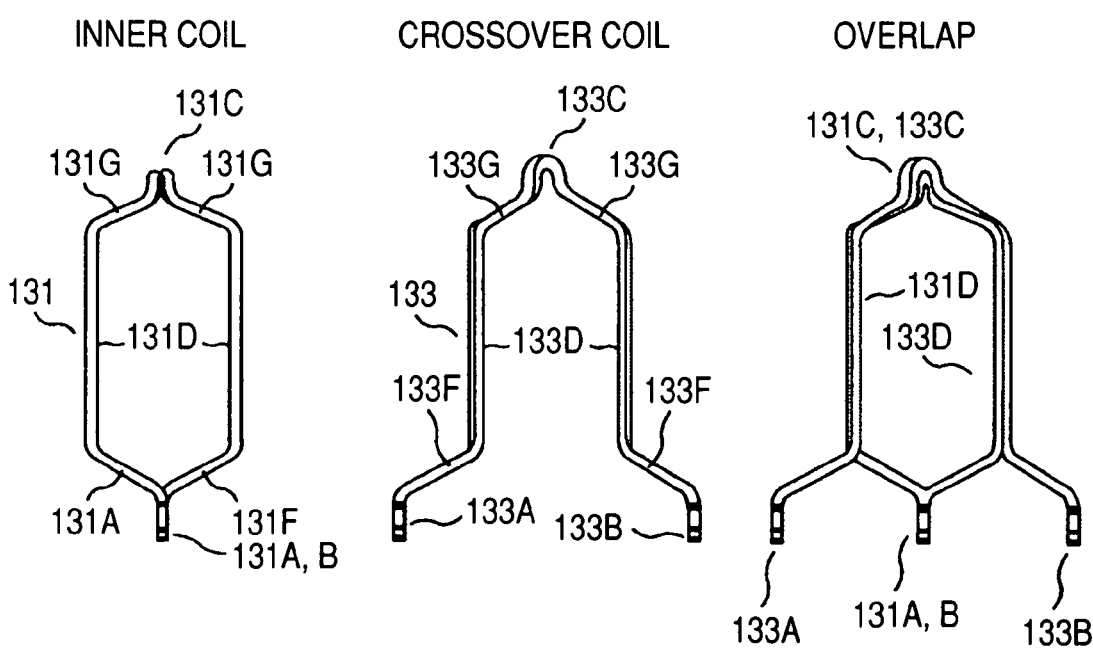
FIG. 18 is a diagram showing an inner coil and an outer coil each formed in the hexagonal shape.

As shown in FIG. 18, the inner and outer coils 131, 133 are each formed in a generally hexagonal shape. Twisted portions 131C, 133C and slant side portions 131G, 131F, 133G, 133F form crossover line portions of stator coils.

In the enamel coating-chipped off portions 131A, 131B, 133A, and 133B, predetermined joined face portions are joined together at their joined faces, then are cut as in FIG. 2, and thereafter welded as in FIGS. 3 and 4.

Figure 19:
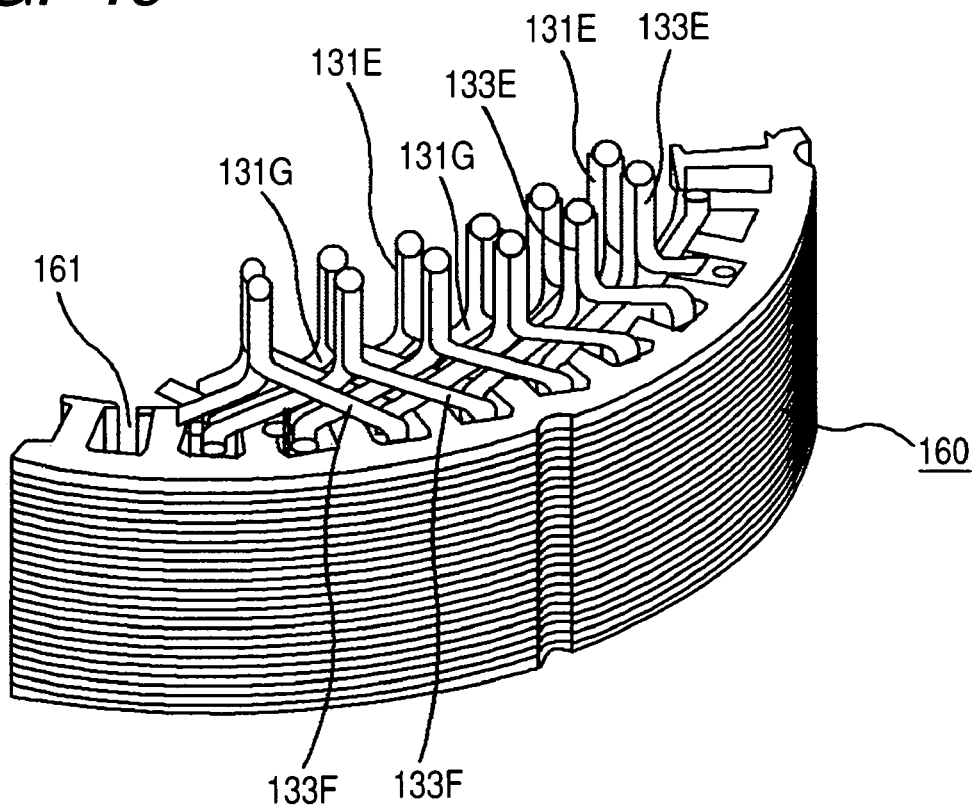
FIG. 19 is a diagram showing a part of a stator of a rotary electric machine according to the present invention.

The coils thus formed are inserted into slots 161 of the stator indicated at 160, as shown in FIG. 19 and are joined by welding in the respective joined face portions to form stator coils.

Next, a process of forming the stator coils 131, 133 and a process of assembling the stator 160 will be described below with reference to FIGS. 20 to 31.

Figure 20:
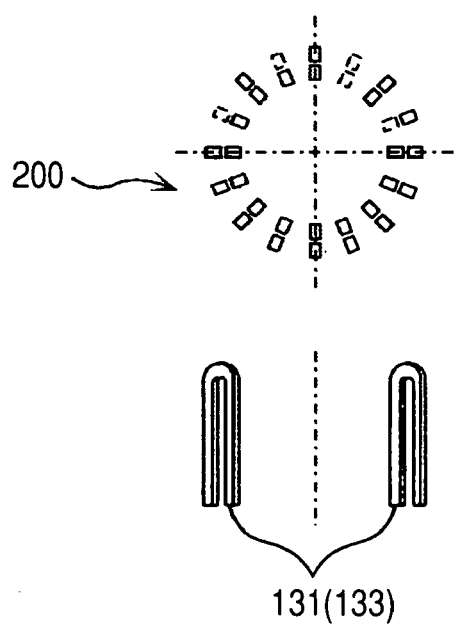
FIG. 20 is a diagram for explaining a process to be carried out prior to a stator assembling process.

The coil conductors shown in FIG. 16 which serve as base metals of the inner and outer coils 131, 133 are formed in U shape in a U shape forming process (not shown), then in the process shown in FIG. 20, plural U-shaped inner and outer coils 131, 133 are inserted and set into separate inserting fixtures 200.

Figure 21:
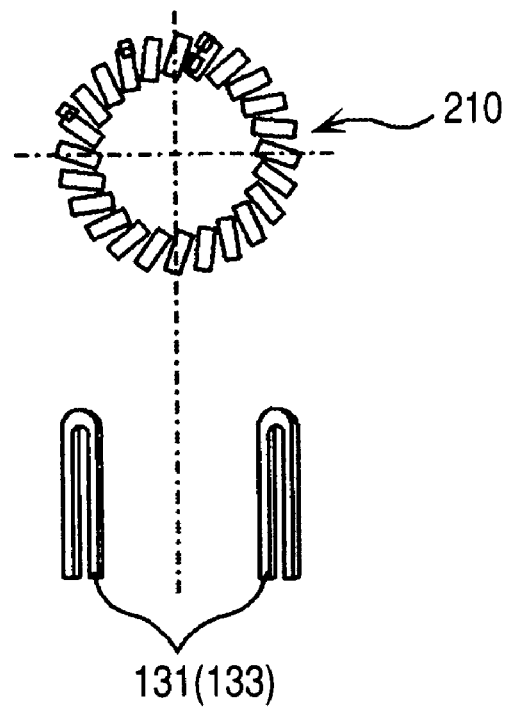
FIG. 21 is a diagram for explaining another process to be carried out prior to the stator assembling process.

In the process shown in FIG. 21, the U-shaped portions of the plural inner and outer coils 131, 133 set in the inserting fixtures 200 are twisted by twisting fixtures 210.

Figure 22:
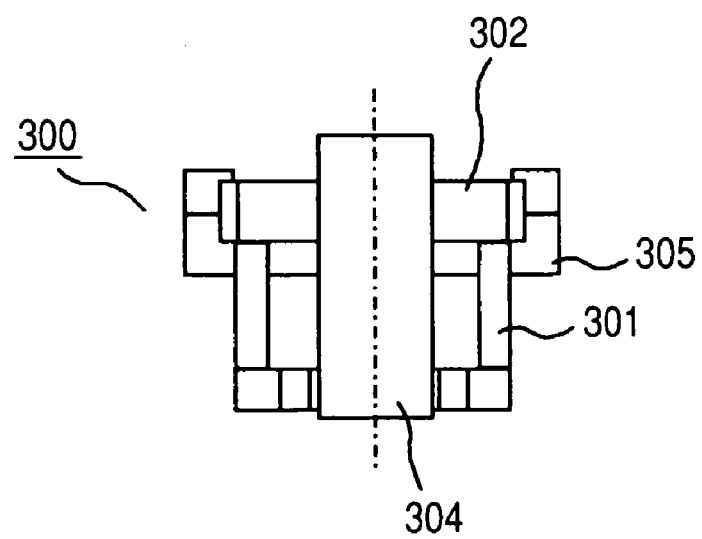
FIG. 22 is a diagram for explaining a state in which a stator core has been set to a stator assembling fixture.

In the process shown in FIG. 22, a stator core 302 is set in a stator assembly fixture 300 provided with a coil guide 301.

Figure 23:
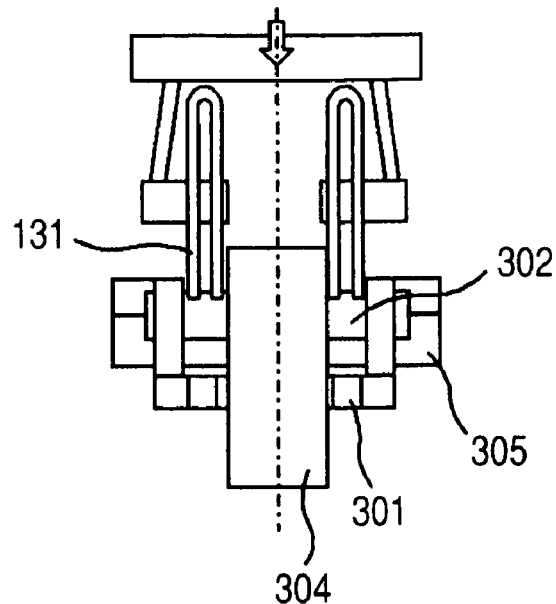
FIG. 23 is a diagram for explaining in which state inner coils are set to the stator core.

In the process shown in FIG. 23, the inner coils 131 are first set using the coil guide 301 into slots formed in the stator core 302 which has been set in the stator assembling fixture 300.

Figure 24:
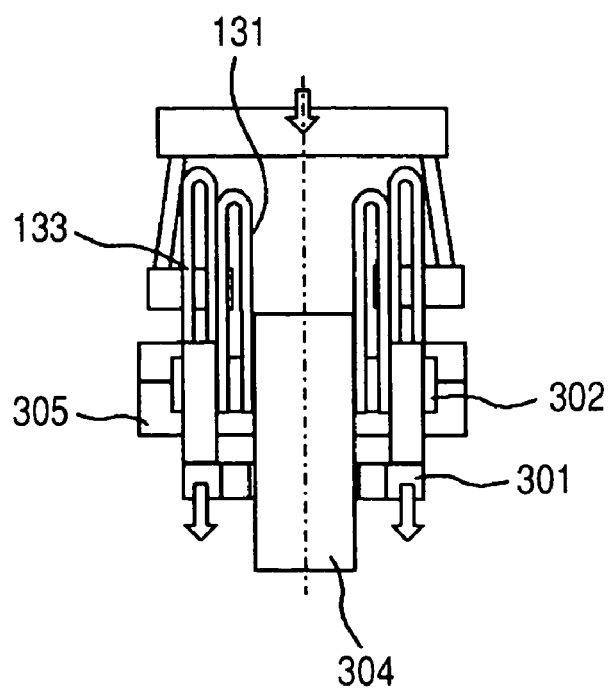
FIG. 24 is a diagram for explaining in which state outer coils are set to the stator core.

In the process shown in FIG. 24, the outer coils 133 are inserted and set into slots formed in the stator core 302 with use of the coil guide 301 so as to be positioned outside the inner coils 131 which have already been set.

Figure 25:
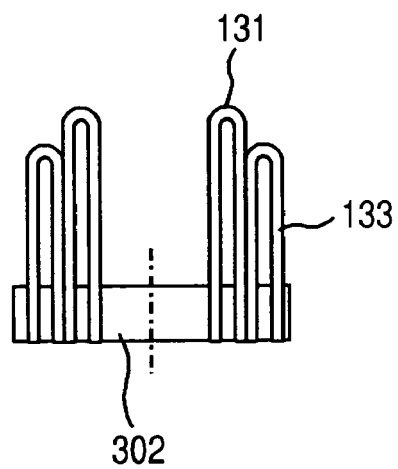
FIG. 25 is a diagram showing the stator core with inner and outer coils set thereto.

FIG. 25 shows the stator core 302 with inner and outer coils 131, 133 set therein.

In this state, joined end portions of the inner and outer coils 131, 133 are not ready for joining yet.

Figure 26:
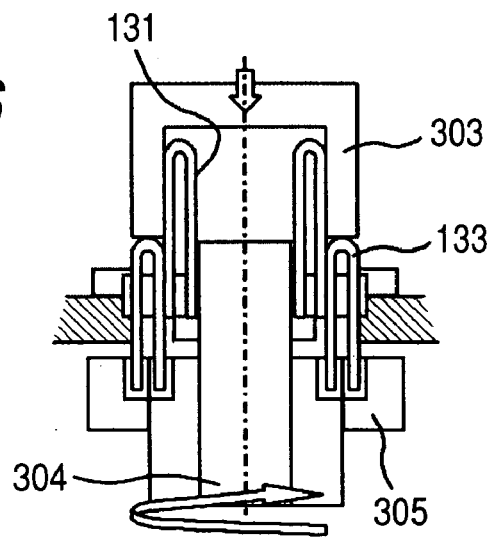
FIG. 26 is a diagram for explaining a process of twisting the outer coils.

In the process shown in FIG. 26, the outer coils 133 are first pushed into the stator 302 with use of a coil pushing jig 303 and a rotary shaft 304 is rotated in e direction of arrow, causing a lower die 305 to rotate and thereby twisting the joining end portions into a predetermined shape.

Figure 27:
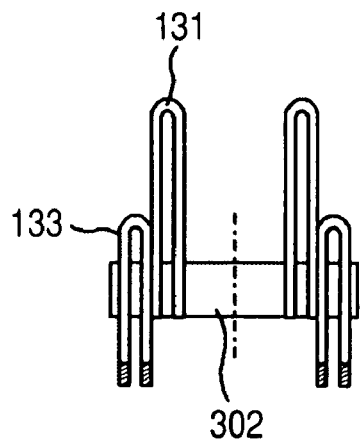
FIG. 27 is a diagram for explaining a process of deforming and caulking the outer coils into a state necessary for joining.

In the process shown in FIG. 27, the lower die 305 is removed and terminals of the outer coils 133 are deformed into a state necessary for joining as in FIG. 1, followed by caulking to effect forming. Thereafter, cutting is performed by the cutting device as in FIG. 2 and preparations are made for welding.

Figure 28:
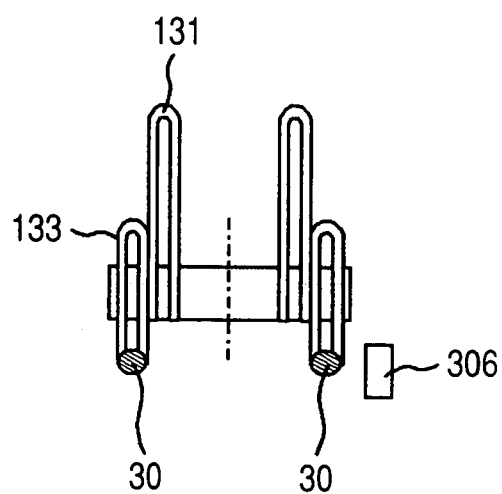
FIG. 28 is a diagram for explaining a process of welding joined face portions of the outer coils.

In the process shown in FIG. 28, the joined face portions are welded by Tig welding by the method shown in FIGS. 3 and 4. At this time, a welding height is measured by a sensor 306 and a check is made to see whether the measured height is an appropriate height or not.

Figure 29:
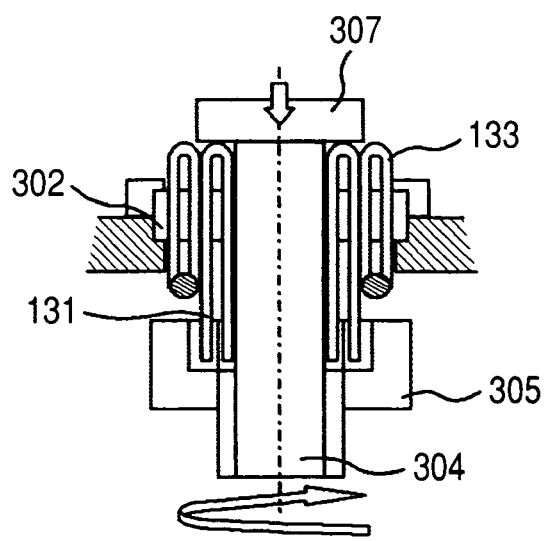
FIG. 29 is a diagram for explaining a process of twisting the inner coils.

In the process shown in FIG. 29, the inner coils 131 are pushed into the stator 302 with use of a coil pushing jig 307 and the rotary shaft 304 is rotated in the direction of arrow to rotate the lower die 305, thereby twisting the joining end portions into a predetermined shape.

Figure 30:
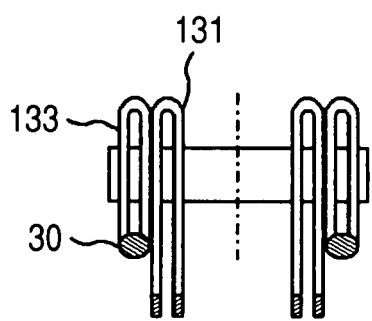
FIG. 30 is a diagram for explaining a process of deforming and caulking the inner coils into a state necessary for joining.

In the process shown in FIG. 30, the lower die 305 is removed and terminals of the inner coils 131 are deformed into a state necessary for joining as in FIG. 1, followed by caulking to effect forming. Thereafter, cutting is performed by the cutting device as in FIG. 2 and preparations are made for welding.

Figure 31:
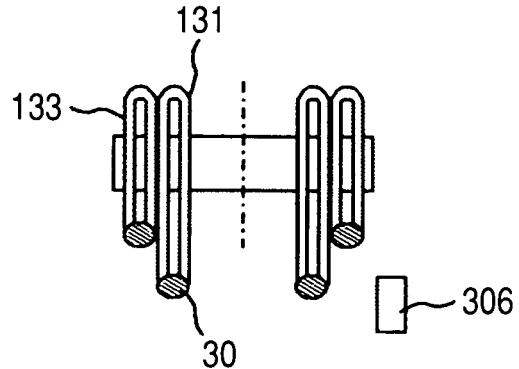
FIG. 31 is a diagram for explaining a process of welding joined face portions of the inner coils.

In the process shown in FIG. 31, the joined face portions are welded by Tig welding by the method shown in FIGS. 3 and 4. At this time, a welding height is measured by the sensor 306 and a check is made to see whether the measured height is an appropriate height or not.

In this way the stator shown in FIG. 19 is obtained.

What is claimed is:

1. An electric wire joint structure comprising:
   insulator-coated wires, each having an insulator coated portion, and a portion where an insulator coating is removed to expose a conductor; wherein
   exposed portions of the conductors are opposed to each other and form joining faces;
   said joining face of each respective insulator-coated wire is flush with a surface of the insulator coating of that respective insulator-coated wire; and
   the joining faces are metallurgically joined to form a joined face portion.

2. The electric wire joint structure according to claim 1, wherein a sectional area of each conductor in the joined face portion is smaller than a sectional area of the insulator-coated portion.

3. The electric wire joint structure according to claim 1, wherein a surface of each conductor in the joined face portion, opposite the joining face, comprises a slant face.

4. The electric wire joint structure according to claim 1, wherein, in the joined face portion, each conductor has a rectangular section.

5. The electric wire joint structure according to claim 1, wherein, in the insulator-coated portion, each conductor has a rectangular section.

6. The electric wire joint structure according to claim 1, wherein, in the insulator-coated portion, each conductor has a circular section.

7. The electric wire joint structure according to claim 3, wherein said slant face is disposed in a portion of said conductor which becomes thinner toward the exposed portion, and is formed between the conductor in the insulator-coated portion and the conductor in the exposed portion.

8. The electric wire joint structure according to claim 2, wherein;
   the section of each conductor in the joined face portion has a rectangular shape defined by long sides and short sides; and
   the joining face of each conductor has an offset relative to the insulator coated portion of said conductor, toward the joining face to which it is joined in the joined face portion.

9. The electric wire joint structure according to claim 1, wherein:
   a slant face portion which becomes thinner toward the exposed conductor portion is formed between the conductor in the insulator-coated portion and the conductor in the exposed conductor portion;
   a section of the conductor in the joined face portion has a rectangular shape comprising long sides and short sides; and
   an outer end of the slant face portion on the long-sides' side extends up to a position more distant from a tip of the exposed conductor portion than an outer end portion of the slant face on the short sides' side.

* * * * *

UNITED STATES PATENT AND TRADEMARK OFFICE
CERTIFICATE OF CORRECTION

PATENT NO.       : 7,615,906 B2                          Page 1 of 1
APPLICATION NO.  : 11/438591
DATED            : November 10, 2009
INVENTOR(S)      : Sakai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this

Fourteenth Day of December, 2010

David J. Kappos
*Director of the United States Patent and Trademark Office*